US008424079B2

(12) United States Patent
Adams et al.

(10) Patent No.: US 8,424,079 B2
(45) Date of Patent: Apr. 16, 2013

(54) METHOD, SYSTEM AND MOBILE DEVICE EMPLOYING ENHANCED USER AUTHENTICATION

(75) Inventors: Neil P. Adams, Waterloo (CA); Richard P. Sibley, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1165 days.

(21) Appl. No.: 12/019,923

(22) Filed: Jan. 25, 2008

(65) Prior Publication Data

US 2009/0193514 A1    Jul. 30, 2009

(51) Int. Cl.
G06F 21/00 (2006.01)
G06F 7/04 (2006.01)
G06F 12/00 (2006.01)
G06F 12/14 (2006.01)
G06F 13/00 (2006.01)
G06F 17/30 (2006.01)

(52) U.S. Cl.
USPC .............. 726/17; 726/4; 726/5; 726/6; 726/7; 726/18; 726/19; 713/168; 713/169; 713/176; 713/186

(58) Field of Classification Search ................. 726/4–7, 726/17–19; 713/168, 169, 176, 186
See application file for complete search history.

(56) References Cited

U.S. PATENT DOCUMENTS

| 6,366,915 | B1 * | 4/2002 | Rubert et al. ................. 707/770 |
| 6,651,168 | B1 * | 11/2003 | Kao et al. ...................... 713/185 |
| 7,493,952 | B2 * | 2/2009 | Ayasse .......................... 166/261 |
| 7,685,630 | B2 * | 3/2010 | Thapliyal et al. ................. 726/4 |
| 7,721,326 | B2 * | 5/2010 | Bauban et al. .................... 726/5 |
| 7,810,143 | B2 * | 10/2010 | Ruzyski et al. ................... 726/5 |
| 2001/0007592 | A1 | 7/2001 | Pu et al. |
| 2002/0152034 | A1 * | 10/2002 | Kondo et al. .................. 702/19 |

(Continued)

FOREIGN PATENT DOCUMENTS

| DE | 103 17 296 | 11/2004 |
| EP | 1 251 468 | 10/2002 |
| GB | 2 342 744 | 4/2000 |
| WO | 2007010799 | 1/2007 |

OTHER PUBLICATIONS

European Examination Report dated Mar. 25, 2009, European Patent Application No. 08150681.8.
European Search Report. Application No. 08150681.8. Dated: Jul. 1, 2008.

(Continued)

*Primary Examiner* — Edan Orgad
*Assistant Examiner* — Kari Schmidt
(74) *Attorney, Agent, or Firm* — Bereskin & Parr LLP/S.E.N.C.R.L., s.r.l.

(57) ABSTRACT

The described embodiments relate generally to methods and systems for user authentication for a computing device. In one embodiment, the method comprises: enabling receipt of input in relation to selection of a plurality of authenticators for consecutive use by the computing device to authenticate a user; and storing reference information identifying the selected plurality of authenticators in a memory of the computing device. The computing device may comprise a mobile device.

19 Claims, 7 Drawing Sheets

U.S. PATENT DOCUMENTS

| | | | |
|---|---|---|---|
| 2005/0128349 A1* | 6/2005 | Takamori et al. | 348/441 |
| 2006/0005022 A1* | 1/2006 | Wakamori et al. | 713/168 |
| 2006/0242427 A1* | 10/2006 | Ruzyski et al. | 713/186 |
| 2006/0282671 A1* | 12/2006 | Burton | 713/176 |
| 2007/0067642 A1* | 3/2007 | Singhal | 713/186 |
| 2007/0136573 A1* | 6/2007 | Steinberg | 713/155 |
| 2007/0136792 A1* | 6/2007 | Ting et al. | 726/5 |
| 2008/0134308 A1* | 6/2008 | Yalakanti et al. | 726/6 |
| 2009/0141948 A1* | 6/2009 | Nakaoka et al. | 382/118 |

OTHER PUBLICATIONS

European Examination Report dated Nov. 4, 2011, European Patent Application No. 08150681.8.

Canadian Office Action dated Nov. 7, 2011, Canadian Patent Application No. 2,647,309.

European Examination Report dated Aug. 15, 2011, European Patent Application No. 08150681.8.

* cited by examiner

METHOD, SYSTEM AND MOBILE DEVICE EMPLOYING ENHANCED USER AUTHENTICATION

TECHNICAL FIELD

The described embodiments relate to methods, systems and mobile devices employing enhanced user authentication. In particular, the described embodiments enable configuration of the mobile device for use of multiple different authenticators consecutively to allow authorized access to the mobile device.

BACKGROUND

For mobile devices and other computing devices, authentication of a user for access to the mobile device or computing device is an important part of securing the device against unauthorized access to potentially sensitive data.

Some existing computer operating systems allow installation of multiple authenticators on the computer system so that, when a user is authenticating the user's authority to access the computer, the user can choose one of the installed authenticators to perform the authentication and thereby gain access to the computer system. In such operating systems, each time the user wishes to authenticate itself to the computer system, the user can choose a different authenticator from among the installed authenticators.

BRIEF DESCRIPTION OF THE DRAWINGS

Embodiments are described in further detail below, by way of example only, with reference to the accompanying drawings, in which.

DETAILED DESCRIPTION

Figure 1:
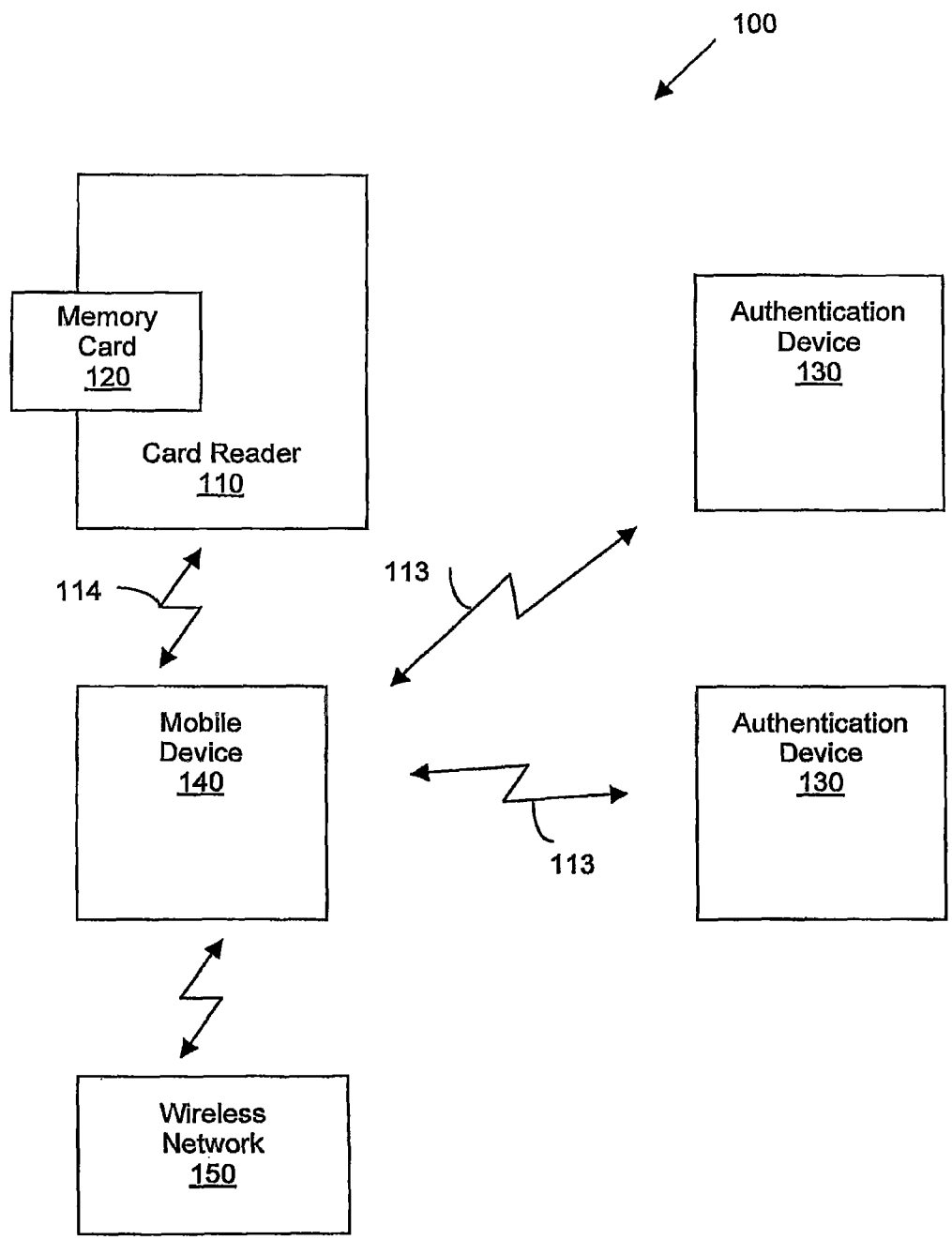
FIG. 1 is a block diagram of a system for authenticating a user.

The existing computer operating systems described above only allow a single one of the authenticators to be chosen for performing the authentication of the user. If any one of the authenticators installed on the computer system is insecure, this compromises the security of the entire system because an unauthorized user may be able to gain access to the computer system using the insecure authenticator.

The described embodiments relate generally to methods, systems and mobile devices employing enhanced user authentication. Further embodiments relate generally to computing devices that employ enhanced user authentication. Mobile devices are used herein as one example of a type of computing device. The enhanced user authentication involves configuring the mobile device (or other computing device) to require authentication by the user using multiple consecutive authenticators.

The order of authentication may be selected by a user or system administrator during the authenticator configuration. Use of multiple authenticators in a predetermined order increases the security of the mobile device (or other computing device) by adding further authentication layers and thereby reducing the possibility of unauthorized access to the device.

Multiple authenticators may be installed on the mobile device. The authenticators may include, for example, smart card, fingerprint, handprint, facial image, retinal, iris, voice, DNA, and/or other authenticators. Thus, for example, the user or system administrator may configure the mobile device to employ any of the multiple authenticators in combination, in a specific order. If it is considered that a particular one of the authenticators is essential for optimizing security, that authenticator can be used as part of a combination of authenticators. For example, it may be specified by the system administrator that each mobile device must use a smart card authenticator, together with one or more of the fingerprint, handprint, facial image, retinal, iris, voice, DNA and/or other authenticators. Alternatively, authenticator configuration may be done without reference to any of the authenticators being considered to be essential to the authentication procedure, and the user may simply choose two or more of the installed authenticators to be used in combination.

Certain embodiments relate to a method for user authentication for a computing device. The method comprises: enabling receipt of input in relation to selection of a plurality of authenticators for consecutive use by the computing device to authenticate access to the computing device or data stored therein; and storing reference information identifying the selected plurality of authenticators in a memory of the computing device. The computing device may comprise a mobile device.

The input may be received in relation to a required authenticator selection and at least one optional authenticator selection. The input may be in relation to a selected order of consecutive use of the plurality of authenticators to authenticate access to the computing device or data stored therein and the storing may comprise storing order-of-use information in the memory that identifies the selected order. The plurality of authenticators may be selected from the group consisting of: a smart card authenticator; a fingerprint authenticator; a handprint authenticator; an iris authenticator; a DNA authenticator; a voice authenticator; a retinal authenticator; and a facial image authenticator.

The enabling may comprise launching an authenticator configuration application to display an authenticator configuration window on a display of the computing device and the authenticator configuration window may comprise a plurality of selectable authenticator options, each selectable authenticator option corresponding to a respective one of the plurality of authenticators. The selectable authenticator options may be displayed in the authenticator configuration window to indicate an order of consecutive use of the plurality of authenticators, and the selectable authenticator options can be displayed to indicate an alternative order of consecutive use of the plurality of authenticators in response to the input.

Other embodiments relate to a method of user authentication for a computing device. The method comprises: determining that user authentication is required to be performed in relation to the computing device or data stored therein; retrieving from a memory of the computing device reference information identifying a plurality of authenticators for consecutive use to perform the user authentication; performing a first authentication using a first authenticator of the plurality of authenticators; performing a next authentication using a next authenticator of the plurality of authenticators if the first authentication is successful; and allowing access to the computing device or data stored therein if the next authentication is successful. The first and next authentications may be performed in a predetermined order based on the reference information. The plurality of authenticators may be selected from the group consisting of: a smart card authenticator; a fingerprint authenticator; a handprint authenticator; an iris authenticator; a DNA authenticator; a voice authenticator; a retinal authenticator; or a facial image authenticator.

Other embodiments relate to a method of user authentication for a computing device. The method comprises: determining that user authentication is required to be performed in relation to the computing device or data stored therein; retrieving from a memory of the computing device reference information identifying a plurality of authenticators for consecutive use to perform the user authentication; performing a first authentication using a first authenticator of the plurality of authenticators; performing a next authentication using a next authenticator of the plurality of authenticators; and allowing access to the computing device or data stored therein if the first authentication is successful and the next authentication is successful.

Other embodiments relate to a computing device comprising: a processor; a display responsive to the processor; at least one communication subsystem responsive to the processor for communicating with a plurality of authentication devices; input componentry communicably coupled to the processor; and a memory. The memory is accessible to the processor and stores program code which, when executed by the processor, causes the processor to enable receipt of input from the input componentry in relation to selection of a plurality of authenticators for consecutive use to authenticate a user, and to store in the memory reference information identifying the selected plurality of authenticators. The plurality of authenticators may be selected from the group consisting of: a smart card authenticator; a fingerprint authenticator; a handprint authenticator; an iris authenticator; a DNA authenticator; a voice authenticator; a retinal authenticator; and a facial image authenticator.

The input may be received in relation to a required authenticator selection and at least one optional authenticator selection. The input may be further in relation to a selected order of consecutive use of the plurality of authenticators to authenticate the user and the processor may store order-of-use information in the memory that identifies the selected order.

In some embodiments, when the program code is executed by the processor, the processor is further caused to launch an authenticator configuration application to display an authenticator configuration window on the display, wherein the authenticator configuration window comprises a plurality of selectable authenticator options, each selectable authenticator option corresponding to a respective one of the plurality of authenticators. The selectable authenticator options may be displayed in the authenticator configuration window to indicate an order of consecutive use of the plurality of authenticators, and the selectable authenticator options can be displayed to indicate an alternative order of consecutive use of the plurality of authenticators in response to the input.

The memory of the computing device may further store program code which, when executed by the processor, causes the process to: determine that user authentication is required to be performed in relation to the computing device or data stored therein; retrieve from the memory the reference information; perform a first authentication using a first authenticator of the plurality of authenticators, wherein the first authenticator is identified by the reference information; perform a next authentication using a next authenticator of the plurality of authenticators if the first authentication is successful, wherein the next authenticator is identified by the reference information; and allow access to the computing device or data stored therein if the next authentication is successful. The first and next authentications may be performed in a predetermined order based on the reference information.

Still other embodiments relate to a computing device comprising: a processor; at least one communication subsystem responsive to the processor for communicating with a plurality of authentication devices; and a memory accessible to the processor. The memory stores program code which, when executed by the processor, causes the processor to: determine that user authentication is required to be performed in relation to the computing device or data stored therein; retrieve from a memory of the computing device reference information identifying a plurality of authenticators for consecutive use to perform the user authentication; perform a first authentication using a first authenticator of the plurality of authenticators; perform a next authentication using a next authenticator of the plurality of authenticators if the first authentication is successful; and allow access to the computing device or data stored therein if the next authentication is successful.

Alternatively, the program code, when executed by the processor, may cause the processor to: determine that user authentication is required to be performed in relation to the computing device or data stored therein; retrieve from a memory of the computing device reference information identifying a plurality of authenticators for consecutive use to perform the user authentication; perform a first authentication using a first authenticator of the plurality of authenticators; perform a next authentication using a next authenticator of the plurality of authenticators; and allow access to the computing device or data stored therein if the first authentication is successful and the next authentication is successful.

Further embodiments relate to computer readable storage storing program code which, when executed by a processor in a computing device, causes the processor to enable receipt of input in relation to selection of a plurality of authenticators for consecutive use to authenticate access to the computing device or data stored therein, and to store in a memory reference information identifying a selected plurality of authenticators.

Still further embodiments relate to computer readable storage storing program code which, when executed by a processor, causes the processor to perform a method of user authentication, comprising: determining that user authentication is required to be performed in relation to a computing device or data stored therein; retrieving from a memory of the computing device reference information identifying a plurality of authenticators for consecutive use to perform the user authentication; performing a first authentication using a first authenticator of the plurality of authenticators; performing a next authentication using a next authenticator of the plurality of authenticators if the first authentication is successful; and allowing access to the computing device or data stored therein if the next authentication is successful.

Still further embodiments relate to computer readable storage storing program code which, when executed by a processor, causes the processor to perform a method of user authentication, comprising: determining that user authentication is required to be performed in relation to a computing device or data stored therein; retrieving from a memory of the computing device reference information identifying a plurality of authenticators for consecutive use to perform the user authentication; performing a first authentication using a first authenticator of the plurality of authenticators; performing a next authentication using a next authenticator of the plurality of authenticators; and allowing access to the computing device or data stored therein if the first authentication is successful and the next authentication is successful.

In some of the example embodiments described, the smart card authenticator may be a required authenticator, for example to comply with corporate or government security requirements, and thus the mobile device, smart card and card reader are described in further detail below, with reference to FIGS. 1 to 3 to contextualize some of the possible applications of the described embodiments.

FIG. 1 depicts a system 100 for authenticating a user for access to a mobile device 140. The system 100 may comprise a memory card 120 received by, or otherwise communicably coupled with, a card reader 110. "Communicably coupled" as used herein is meant to describe any kind of coupling, for example physical, electrical, logical, signal and/or wireless coupling, or a combination thereof, sufficient to enable communication of signals, data, instructions or other meaningful exchange between the two components. Such coupling may be direct or indirect.

System 100 includes multiple authentication devices 130 in communication with mobile device 140 over a wired or wireless interface. Card reader 110 and memory card 120 effectively act as an authentication device 130. In some embodiments, the card reader may comprise, or be associated with, a biometric scanner (as another authentication device). Such authentication devices 130 include one or more wireless-enabled personal computers 130 and at least one wireless-enabled mobile device 140. Each of the authentication devices 130 may have a wireless transceiver for communicating with mobile device 140, which also has a wireless transceiver, over a communication link 113 or 114. In an alternative embodiment, one or more of the authentication devices 130 may be in communication with mobile device 140 via a wired connection, such as a universal serial bus (USB) cable.

The mobile device 140 may be any suitable wirelessly enabled mobile device. The mobile device 140 may be a dual mode (data and voice) communication device and personal digital assistant device, such as is described in further detail below in relation to FIG. 2. Alternatively, the mobile device may be a single mode (data) communication device. The mobile device 140 may be capable of email communication. The user of mobile device 140 is required to authenticate the user's identity for use of the mobile device 140, for example by providing a password or a personal identification number (PIN) code or other authentication methods as described herein, for example to unlock a user interface of mobile device 140, to digitally sign a message or to decrypt an encrypted message.

Authentication devices 130 may comprise any kind of suitably secure authentication device, such as a retinal, iris, voice, DNA, facial image, handprint and/or fingerprint scanner, which may be communicably coupled to, or comprised in, a portable or fixed computer system which may require access to memory card 120. While not specifically shown in FIG. 1, each authentication device 130 is enabled for wireless and/or wired communication (either by itself or via an associated computer system) with mobile device 140 and/or card reader 110 in a manner compatible with the communication capabilities of mobile device 140 and/or card reader 110 (described below in relation to FIG. 3).

Memory card 120 may be a smart card. Smart cards generally refer to personalized security devices, defined by the ISO 7816 standard and its derivatives, as published by the International Organization for Standardization. A smart card may have a form factor of a credit card and may include a semiconductor device. The semiconductor device may include a memory that can be programmed with security information, for example such as a private decryption key, a private signing key, biometrics information or an authentication certificate. The semiconductor device may include a decryption engine, such as a processor and/or dedicated logic circuitry for performing decryption and/or authentication functions. The smart card may include a connector for powering the semiconductor device and performing serial communication with an external device, such as card reader 110.

Smart cards generally have exposed contacts on one surface of the card for establishing electrical contact with corresponding contacts on the card reader, thereby facilitating communication between the smart card and the card reader. In one embodiment, memory card 120 and card reader 110 use electrical contact to establish communication therebetween. Although memory card 120 may be physically received in card reader 110, it is not essential that card reader 110 physically receive or contact memory card 120 in order to establish communication therebetween. For example, in an alternative embodiment, memory card 120 may interface with card reader 110 using radio frequency identification records (RFID) technology. In such an alternative embodiment, the memory card 120 need only be sufficiently proximate to card reader 110 to enable radio frequency communication therebetween.

Mobile device 140 may be enabled to communicate with a wireless network 150. The wireless network 150 may be implemented as a packet-based cellular network that includes a number of base stations each providing wireless Radio Frequency (RF) coverage to a corresponding area or cell. For example, the wireless network 150 could conform to one or more of the following, among other network standards: Mobitex Radio Network; DataTAC; Global System for Mobile Communication (GSM); General Packet Radio System (GPRS); Time Division Multiple Access (TDMA); Code Division Multiple Access (CDMA); Cellular Digital Packet Data (CDPD); integrated Digital Enhanced Network (iDEN); or various other third or higher generation networks such as Enhanced Data rates for GSM Evolution (EDGE) or Universal Mobile Telecommunications Systems (UMTS), etc.

In some embodiments, instead of, or in addition to, a wireless wide area network, the wireless network 150 may include a wireless local area network, such as, for example, a wireless local area network that conforms to one or more IEEE 802.11 standards, such as 802.11b, 802.11g and 802.11n. In at least some example embodiments, the wireless network 150 is connected, through intermediate communications links (not shown), including, for example, links through the Internet, to one or more enterprise networks (not shown). Typically, such enterprise networks are each associated with a set of respective mobile devices 140, such that the mobile devices 140 are each enabled to exchange electronic messages and other information with the enterprise networks with which the mobile devices 140 are associated.

Figure 2:
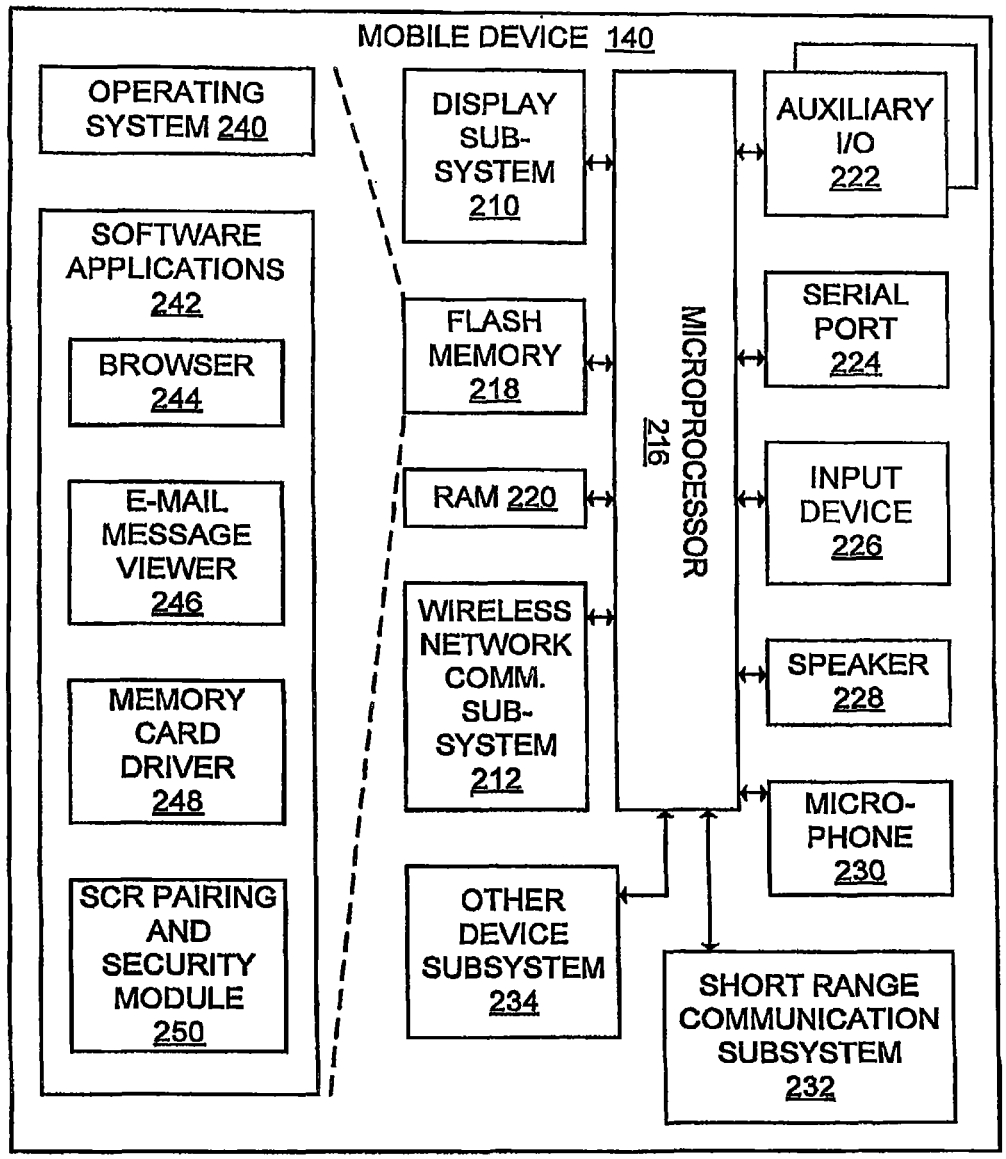
FIG. 2 is a block diagram of a mobile device for use in the system of FIG. 1.

FIG. 2 illustrates a detailed embodiment of the mobile device 140. The mobile device 140 may comprise a display sub-system 210 and a wireless network communication subsystem 212 for two-way communications with the wireless network 150 (FIG. 1). According to one embodiment, the communication subsystem 212 includes antennas (not shown), RF transceivers (not shown) and some signal processing capabilities that may be implemented, for example, by a digital signal processor (not shown). The mobile device 140 also includes a controller in the form of at least one mobile device microprocessor 216 that is suitably programmed to control the overall operation and functions of the mobile device 140, which are described in more detail below.

The mobile device 140 may further comprise peripheral devices and/or subsystems. Such peripheral devices and/or subsystems may include, for example, as a flash memory 218, a random access memory (RAM) 220, an auxiliary input/output (I/O) subsystem 222 (e.g., a scroll wheel, trackball, joystick, directional-pad, touch-screen or other navigational component), a serial port 224 (e.g., a Universal Serial Bus, or "USB", port), an input device 226, a speaker 228, a microphone 230, a mobile device short-range communications subsystem 232 and/or an other device subsystem designated generally by reference 234. The short-range communication subsystem 232 may comprise, for example, an infrared transceiver, wireless bus protocol system, such as Bluetooth™, and/or other means of local wireless communications. The input device 226 may comprise, for example, a keyboard, a keypad and/or a touch-screen. The touch-screen may be used in combination with a stylus.

The mobile device microprocessor 216 operates under stored program control with code or firmware being stored in the flash memory 218 (or other type of non-volatile memory device or devices). As depicted in FIG. 2, the flash memory 218 includes stored programs (e.g., firmware) including an operating system program or code module 240 and other programs or software applications indicated generally by reference 242. The software applications 242 can, for example, include a World Wide Web (WWW) browsing application 244 and an e-mail client application 246.

According to example embodiments, the software applications 242 of the mobile device 140 further include a memory card driver 248 that may be used in conjunction with the card reader 110, which is described in more detail below in connection with FIG. 3. Notably, the memory card driver 248 may be provided, not by the manufacturer of the mobile device 140, but, instead, by a third party, e.g., the manufacturer of the memory card 120. Furthermore, an Application Programming Interface (API) may be built in to the memory card driver 248 to allow the mobile device 140 to communicate with the memory card 120 through the card reader 110.

The software applications 242 of the mobile device 140 may further include a smart card reader (SCR) pairing and security module 250 for coordinating a pairing process between the mobile device 140 and the card reader 110. The roles of the memory card driver 248 and the smart card reader pairing and security module 250 will be described in greater detail below.

The operating system code 240, code for specific device applications 242, code for the WWW browsing application 244, code for the e-mail client application 246, code for the memory card driver 248, or code for the smart card reader pairing and security module 250 may be temporarily loaded into a volatile storage medium such as the RAM 220 during operation of the mobile device 140. Received communication signals and other data with information may also be stored in the RAM 220. In some embodiments, the mobile device 140 may include, in addition to the internal flash memory 218, persistent memory carried on a SIM (Subscriber Identity Module) card, or other removable device, and at least some of the flash memory 218 may be allocated to the SIM card flash memory.

The stored program control (i.e., the software applications 242) for the mobile device microprocessor 216 also includes a predetermined set of applications, code components or software modules that control basic device operations, for example, data and voice communication applications which are normally installed on the mobile device 140 as the software applications 242 during the manufacturing process. Further applications may also be loaded (i.e., downloaded) onto the mobile device 140 through the operation of networks described above, the auxiliary I/O subsystem 222, the serial port 224 or the mobile device short-range communications subsystem 232. The downloaded code modules or components are then installed by the user (or automatically) in the RAM 220 or the non-volatile program memory (e.g., the flash memory 218).

The serial port 224 comprises a USB-type interface port for interfacing or synchronizing with another device, such as a desktop or notebook computer (not shown). The serial port 224 is used to set preferences through an external device or software application. The serial port 224 is also used to extend the capabilities of the mobile device 140 by providing for information or software downloads, including user interface information, to the mobile device 140 other than through a wireless communication network. In one embodiment, the serial port 224 may be used to communicate with card reader 110.

The mobile device short-range communications subsystem 232 provides an interface for communication between the mobile device 140 and other devices, including the card reader 110, to be described in greater detail in connection with FIG. 3, below. For example, the mobile device short-range communications subsystem 232 may employ an infrared communication link or channel, or may operate according to a wireless bus protocol, such as Bluetooth™, or any other localized wireless means of communication.

Figure 3:
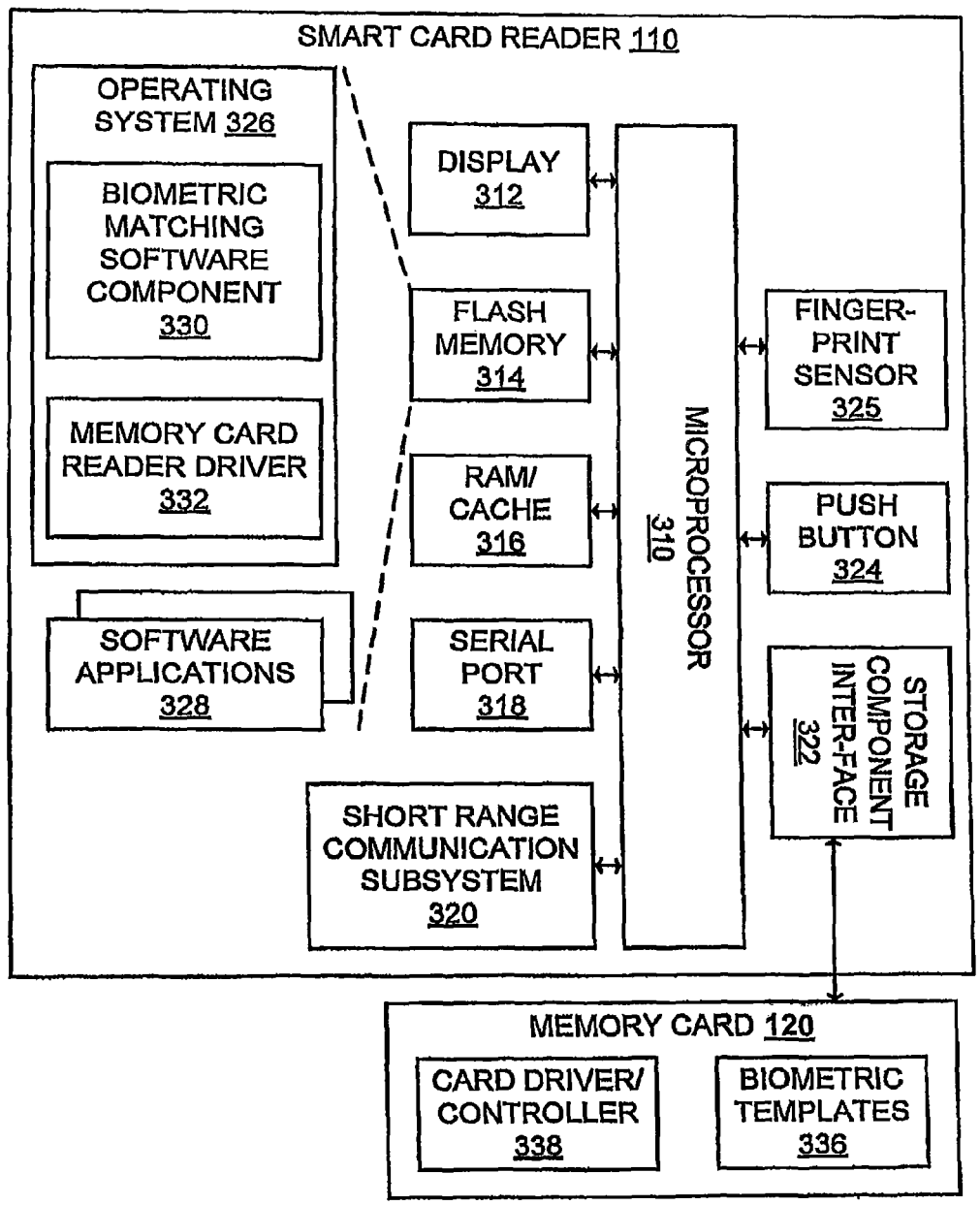
FIG. 3 is a block diagram of a memory card reader for use in some embodiments of the system of FIG. 1.

FIG. 3 illustrates an example embodiment of the card reader 110, in the exemplary form of a smart card reader. The card reader 110 may comprise a controller including at least one smart card reader microprocessor 310, which is suitably programmed to control the overall operation and functions of the card reader 110.

The card reader 110 may further comprise an output device 312 (e.g., a display module). The card reader 110 may further comprise peripheral devices or subsystems such as a flash memory 314, a random access memory (RAM) 316, which, in some embodiments, includes a portion allocated to a data cache, a serial port 318 (e.g., a USB port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and optionally a biometric input device 325 (e.g., a fingerprint sensor).

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The operating system 326 of the card reader 110 further includes a biometric matching software component 330 and a memory card reader driver component 332.

The biometric matching software component 330 is used to analyze or compare candidate biometrics scanned by the biometric input device 325 (as one form of authentication device 130) in reference to stored biometric templates.

The memory card reader driver component 332 is responsible for coordinating communications between the card reader 110 and a memory card 120 and/or the memory card driver 248 of the mobile device 140 (via wired or wireless communication link 114).

The operating system code 326, code for specific device applications 328, code for the biometric matching software component 330, code for the memory card reader driver component 332, or code components thereof, may be temporarily loaded into a volatile storage medium such as the RAM 316. Received communication signals and other data may also be stored in the RAM 316. Additionally, the storage component interface 322 receives the removable memory card 120, providing additional storage space for the card reader 110.

In one embodiment, the memory card 120 stores biometric templates 336 and has a card driver and controller 338 responsible for coordinating communications between the memory card 120 and the memory card reader driver component 332 of the smart card reader 110. While operation of the card reader 110 is described in a context wherein the memory card 120 is a smart card, it will be understood by those skilled in the art that the card reader 110 may be designed to operate with any suitable form of memory device.

The stored program control (i.e., software applications 328) for the smart card reader microprocessor 310 may include a predetermined set of applications, code components or software modules that control basic device operations, for example, management and security related control of the data of the card reader 110, and may be installed on the card reader 110 as a component of the software applications 328 during the manufacturing process. Further applications may also be loaded (i.e., downloaded) onto the card reader 110 through the operation of the serial port 318, the smart card reader short-range communications subsystem 320 or from the memory card 120. The downloaded code module or components are then installed by the user (or automatically) in the RAM 316 or non-volatile program memory (e.g., the flash memory 314).

While the biometric matching software component 330 and the memory card reader driver component 332 are shown to be an integrated portion of the operating system 326 for security purposes (e.g., because individuals should not be permitted to tamper with the biometric matching software component 330 or the memory card reader driver component 332), the biometric matching software component 330 and/or the memory card reader driver component 332 could be installed as one of the software applications 328 so long as suitable security related precautions are taken to ensure that the biometric matching software component 330 and the memory card reader driver component 332 cannot be modified or tampered with by unauthorized users.

The serial port 318 may be a USB-type interface port for interfacing or synchronizing with another device, such as a desktop computer (not shown) or the mobile device 140. The serial port 318 is used to set preferences through an external device or software application or exchange data with a device, such as the mobile device 140, which data is stored on the memory card 120 that is plugged into the storage component interface 322 of the card reader 110. The serial port 318 is also used to extend the capabilities of the card reader 110 by providing for downloads, to the card reader 110, of information or software, including user interface information.

The short-range communications subsystem 320 provides an interface for communication between the mobile device 140 and the card reader 110. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 232 (FIG. 2) of the mobile device 140 can operate using the same protocol, thereby facilitating wireless communication between the mobile device 140 and the card reader 110. Any communications mechanism and/or protocol may be implemented for the short-range communications subsystems 232, 320, so long as the mobile device 140 and the card reader 110 can communicate with each other when within physical proximity.

Figure 4:
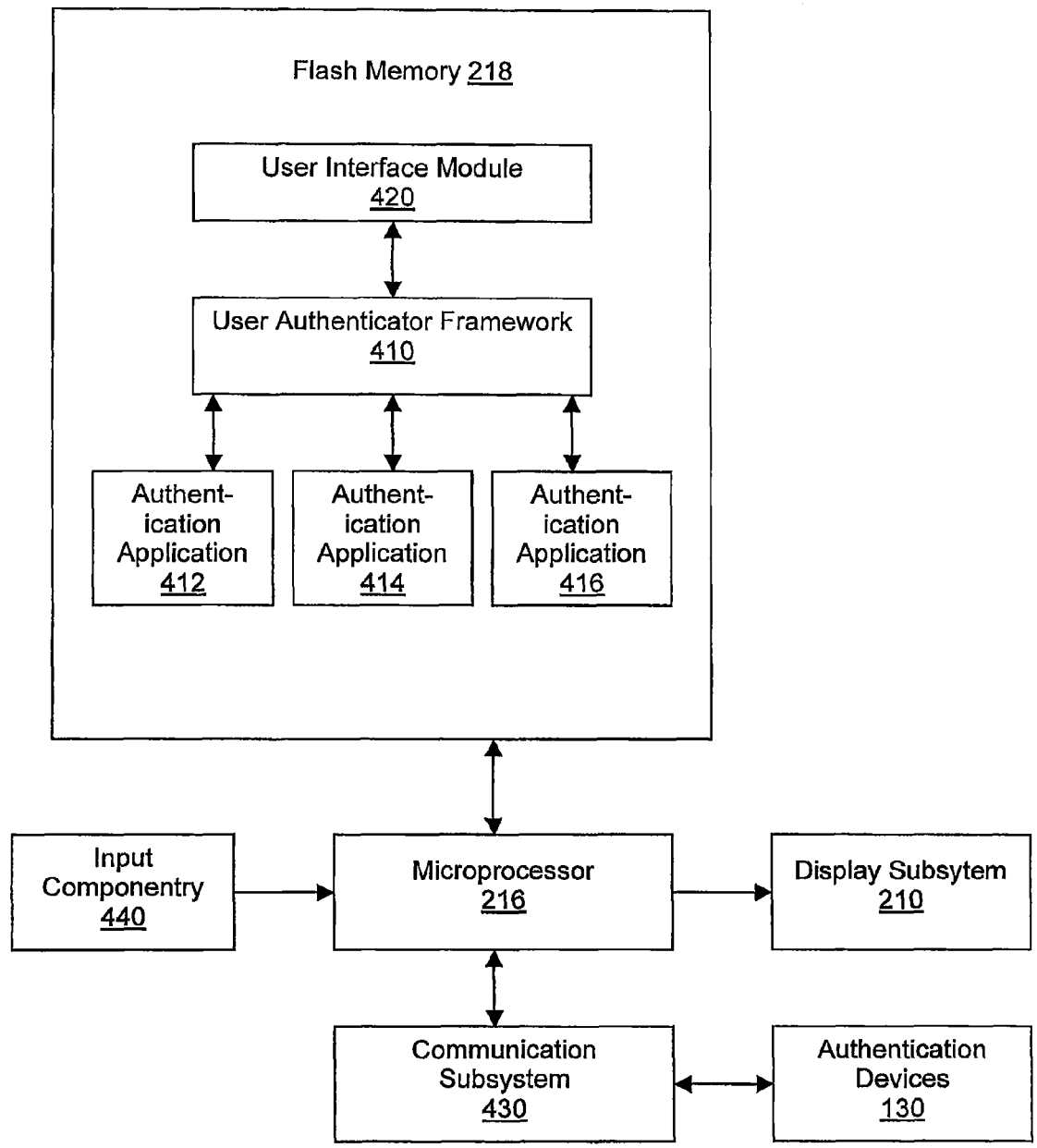
FIG. 4 is a block diagram showing user authentication components of the mobile device in further detail.

Referring now to FIG. 4, there is shown a block diagram illustrating program code modules stored in flash memory 218 in greater detail, in the context of their functions and interactions with other components of mobile device 140 and with one or more authentication devices 130. As shown in FIG. 4, flash memory 218 comprises program code modules executable by microprocessor 216 to provide a user authenticator framework 410, a plurality of authentication applications 412, 414 and 416 and a user interface module 420. Each authentication application performs a specific authentication function, depending on the type of authenticator it is functionally associated with.

User authenticator framework 410 comprises an application that governs user authentication application 412, 414 and 416 and ensures that authentication of the user is carried out properly and securely. User authenticator framework 410 enables authentication configuration to establish which authenticators are to be used during the user authentication process. User authenticator framework 410 may be considered to effectively comprise an authentication configuration application (or module or sub-routine) for this purpose, although such an application is not specifically shown in FIG. 4.

User authenticator framework 410 stores and retrieves reference information that identifies the authenticators selected during configuration so that, when subsequent attempts to access the mobile device 140 (or secure data therein) need to have their access authority authenticated, the user authenticator framework 410 can identify and call upon the appropriate two or more of the authentication applications 412, 414 and 416 to perform their respective authentication functions.

For example, authentication application 412 may perform a smart card authentication function and therefore may employ the memory card driver 248 and SCR pairing and security module 250, while authentication application 414 may be comprised of a program code for enabling mobile device 140 to communicate with an external authentication device 130, such as a retinal scanner. Alternatively, or in addition, one of the authentication applications, such as authentication application 416, may communicate with an external authentication device 130, for example embodied as smart card reader 110 in communication with memory card 120, to authenticate a user based on input received at a biometric input device (such as the fingerprint sensor 325), which may be processed by the biometric matching software component 330 and compared with biometric templates 336.

Authentication applications 412, 414 and 416 may be installed during configuration of mobile device 140, or subsequently. Although three authentication applications are shown in FIG. 4 for illustrative purposes, it will be appreciated by those of skill in the art that two or more authentication applications may be installed for use on mobile device 140.

Each authentication application 412, 414 and 416 is specifically adapted to cooperate with mobile device 140 and the appropriate components of the authentication device 130 to which they are functionally connected or associated. As used herein, the term "authenticator" is intended to comprise a respective authentication application in cooperation with an authentication device 130.

When executing any of the authentication applications 412, 414, 416, microprocessor 216 communicates with the relevant authentication devices 130 via a communication subsystem 430 of mobile device 140. Communication subsystem 430 is communicably coupled to microprocessor 216 and authentication devices 130. Communication subsystem 430 may comprise, for example, serial port 224, short-range communication subsystem 232, wireless network communication subsystem 212 and/or any other component or subsystem of mobile device 140 that is capable of communicating with a device external to mobile device 140.

In some embodiments, the authentication application 412, 414 or 416 may perform very few, if any authentication functions, where such functions are performed by the authentication device 130 and/or the user authentication framework 410. In such embodiments, the authentication application may merely receive and interpret an output from the authentication device 130 and pass this onto the user authentication framework 410, which will then determine whether authentication using the relevant authenticator has been successful. In alternative embodiments, most of the functions of the authenticator may be performed by the authentication application (possibly in combination with the user authentication framework 410) and the authentication device 130 may be primarily an input device for gathering biometric information, such as a retinal, fingerprint or facial image scan, and passing this information on to the relevant authentication application.

User interface module 420 communicates with user authenticator framework 410 in order to generate suitable visual displays on display system 210, including displaying an authentication configuration window 600 (as described below in relation to FIG. 6), based on information provided by user authenticator framework 410. User interface module 420 is employed in combination with user authenticator framework 410 to perform authenticator configuration (as described below in relation to FIG. 5) and, once the configuration has been performed, to perform user interface functions associated with the authentication process (as described below in relation to FIG. 7).

In the context of the user authentication process and/or authenticator configuration process, user interface module 420 interprets user input received, for example, via input componentry 440 of mobile device 140 that is communicably coupled to microprocessor 216, and provides the interpreted user input to user authenticator framework 410 for authentication and/or configuration purposes. User interface module 420 also provides appropriate graphical displays on display subsystem 210 to request user input or notify the user of the success or failure of a part or whole of the authentication process. Input componentry 440 may comprise keyboard 226, auxiliary input/output 222, serial port 224, microphone 230 and/or other device subsystem 234.

Figure 5:
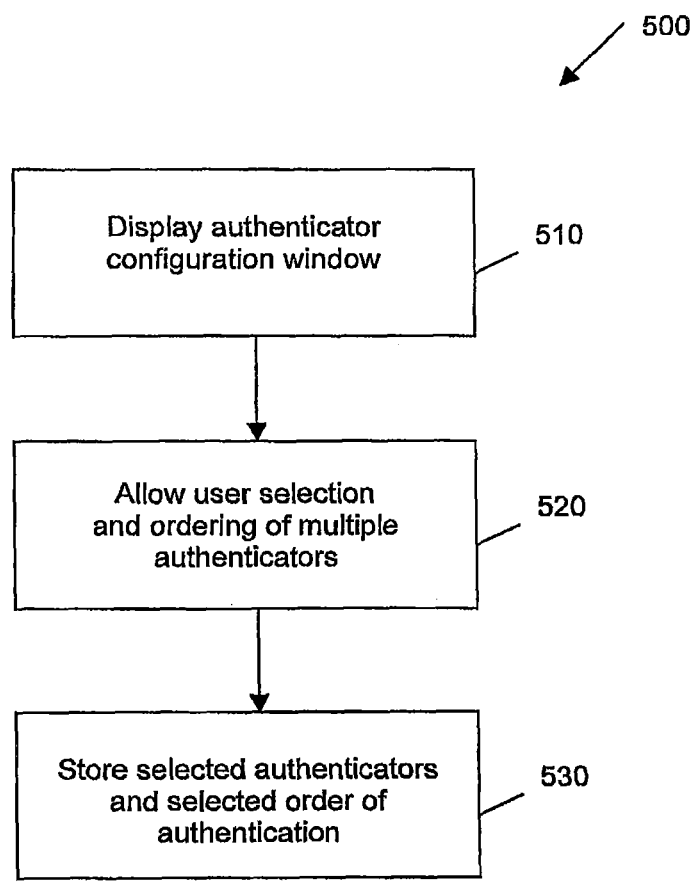
FIG. 5 is a flowchart of a method of user authenticator configuration.
Figure 6:
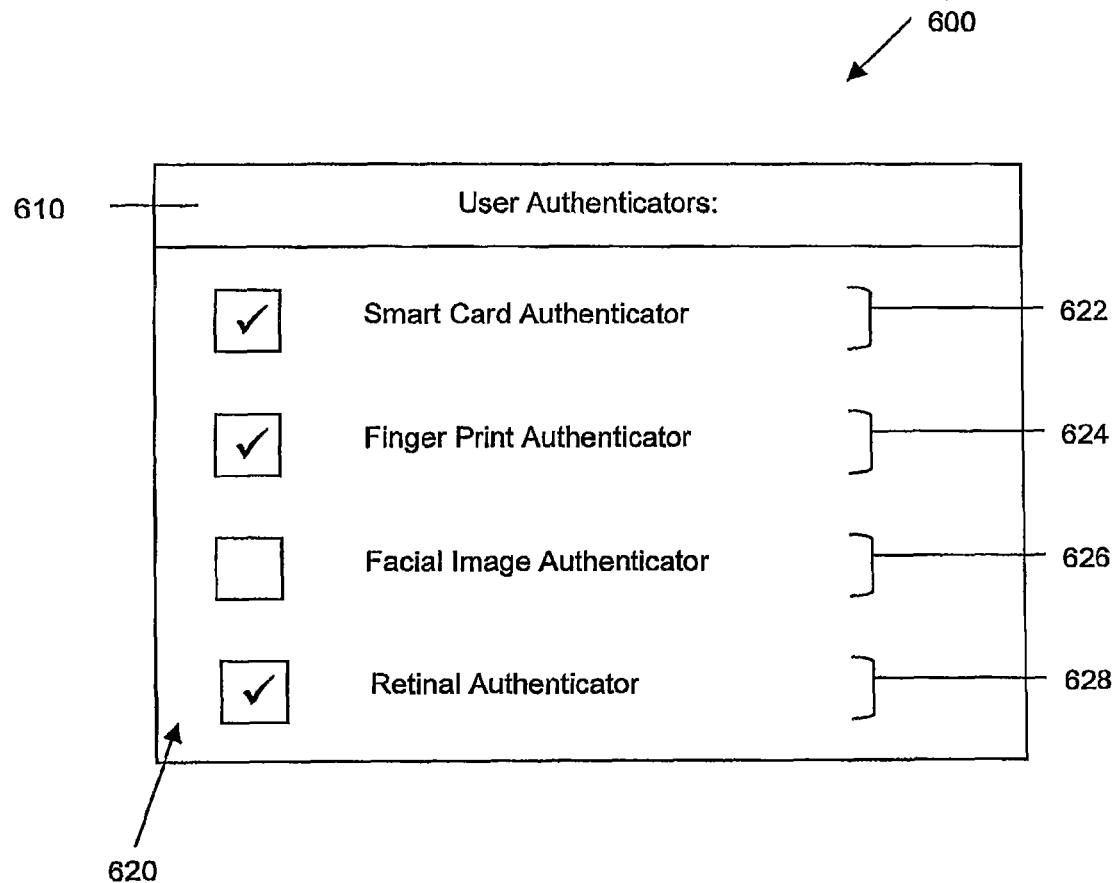
FIG. 6 is an example of an authenticator configuration window displayable on the mobile device.

Referring now to FIGS. 5 and 6, a method 500 of user authenticator configuration is described in further detail, with reference to authenticator configuration window 600. Method 500 begins at step 510, at which authenticator configuration window 600 is displayed on display sub-system 210. Authenticator configuration window 600 may be displayed as a result of user selection of an appropriate menu option or by clicking on an application icon or as part of a set-up wizard, for example.

At step 520, the user of mobile device 140 is allowed to select from among the multiple authenticators for which authentication applications are installed on the mobile device 140. As part of step 520, the user is also allowed to select an order of use of the authenticators, for example, by re-ordering a list 620 of the available and/or selected authenticators. The manner of re-ordering the list 620 of authenticators will depend on the particular user interface functionality provided by mobile device 140 and it will be understood that re-ordering of the list 620 may be accomplished in a number of different ways that would be apparent to those skilled in the art. For example, where user interface functionality permits, an authenticator in list 620 may be dragged and dropped into another part of the list 620. Alternatively, a menu option, such as "move authenticator up list" or "move authenticator down list", may be provided in relation to each authenticator in the list 620, allowing it to be moved up or down the list 620. By default, the authenticator at the top of the list 620 may be used first during the authentication process and the order of subsequent authentication may follow the descending order of the list 620. Instead of the list 620 of authenticators, the authenticators may be visually organized or presented in an alternative manner, such as in a group or cluster.

Selection of the multiple authenticators in step 520 can be effected in a number of different ways, depending on the particular user interface functionality provided by mobile device 140. For example, where the available authenticators are set out as items in a group or list 620, selection or de-selection of an authenticator may be effected by "clicking" on a corresponding selectable authenticator option (or item) 622, 624, 626 or 628 in list 620. Each item in the list 620 or group may have a selection status indicator, such as a graphically toggling icon, like a check box, check circle (button) or a word ("Yes" or "No") or symbol ("Y" or "N") to indicate whether the authenticator is selected or not selected.

The selection status indicator may be graphically distinct from the written text description of the authenticator comprised in each list or group item 622, 624, 626 or 628, or it may be integrated therewith. For example, the check box may be considered to be graphically distinct, but a "halo", bolding, color inversion or other form of emphasis that is integrated with the written text may be used instead as a selection status indicator.

Once the user selection and ordering of the authenticators at step 520 is complete, the user can explicitly or implicitly save the selected configuration, which triggers storage of reference information identifying the selected authenticators and the selected order of authentication, at step 530. Explicit saving of the selected configuration may occur, for example, by selecting a "save" menu option while authenticator configuration window 600 is displayed or by selecting a "save" option on a pop-up window displayed in response to a user request to exit the authenticator configuration window 600. Implicit saving may occur, for example, whenever a selection, deselection or order change is made or may occur if the window 600 is exited without an explicit save.

The reference information identifying the selected authenticators and the order of authentication may be stored in any suitable data format in a record or table within flash memory 218 so as to be accessible to user authenticator framework 410.

FIG. 6 shows one example of an authenticator configuration window 600, where the authentication configuration window comprises a banner portion 610 with a written text description to accompany the list 620 of authenticators. The written text description may comprise, for example, "User Authenticators". The list 620 (or group) of authenticators are arranged beneath the banner portion 610, with each authenticator corresponding to a particular item 622, 624, 626 or 628 in the list 620. Although four items are shown in FIG. 6 as being included in list 620, in other embodiments, two or three, or more than four, items may be included in list 620.

In some embodiments one or more of the authenticators in list 620 may be a required authenticator and thus may be displayed in authenticator configuration window 600 as being constantly selected and may not be unselected. Other authenticators may be optional, in the sense that none of them is specifically required to be used as part of the authentication process, although at least one of the optional authenticators must be selected to be used in combination with the required authenticator. In alternative embodiments, two or more of the authenticators may be selected from the list 620, without any requirement as to which of the authenticators must be included in the selection.

Figure 7:
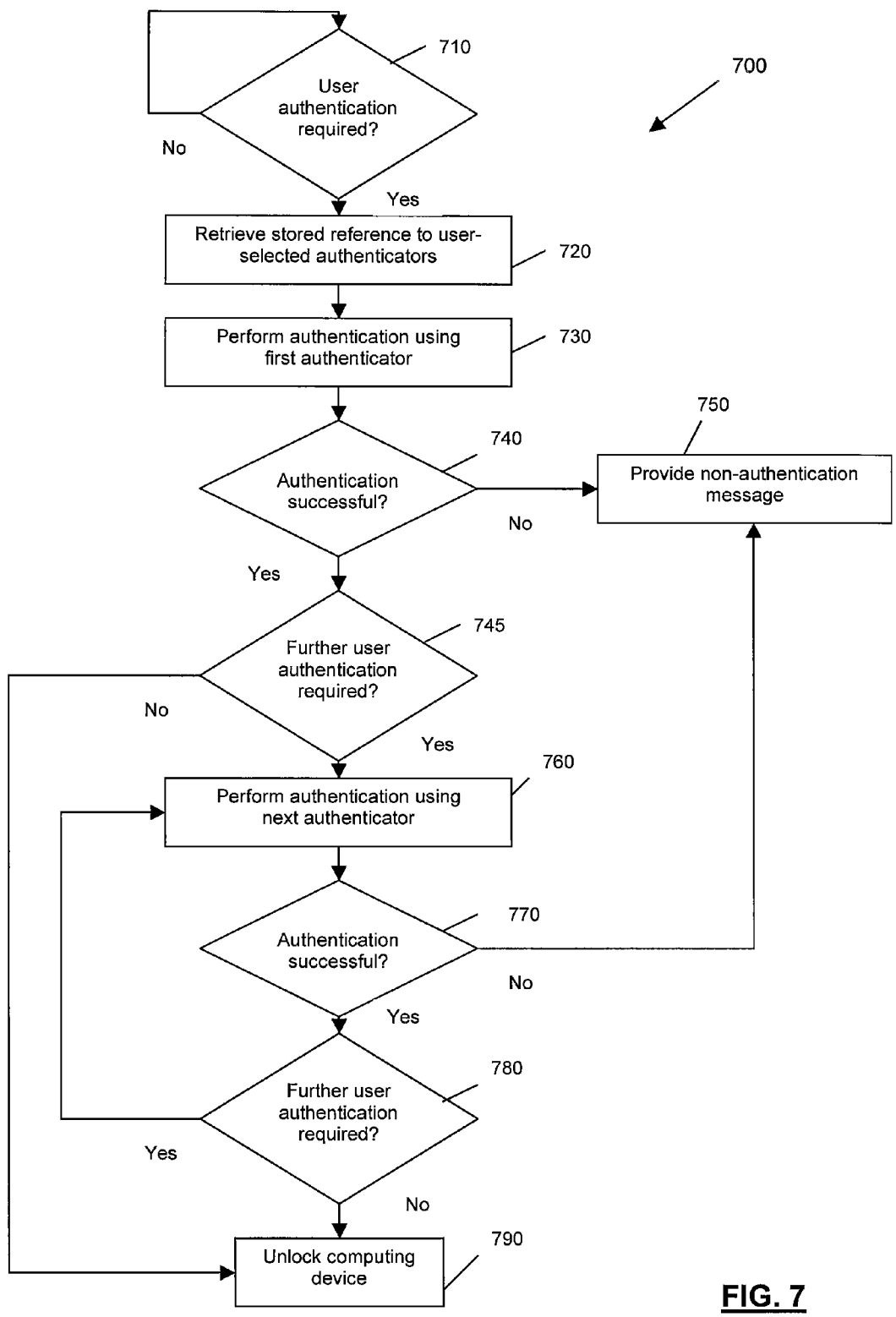
FIG. 7 is a flowchart of a method of user authentication.

Referring now to FIG. 7, a method 700 of user authentication is described. Method 700 begins at step 710, at which the user authentication framework 410 determines whether user authentication is required, for example, where the mobile device 140 is requested by a user to be accessed or where the user is required to be authenticated to access sensitive information stored on mobile device 140.

Once the user authentication framework 410 determines that authentication is required in order to access mobile device 140 or data stored therein, user authentication framework 410 retrieves the reference information (previously stored at step 530) relating to the user selected authenticators and their selected order of use, at step 720. From the retrieved reference information, user authentication framework 410 identifies which authenticator is to be used first in the authentication process and which one or more further authenticators are to be used next.

At step 730, user authentication framework 410 cooperates with the appropriate authentication application 412, 414, or 416 (corresponding to the first authenticator) and the appropriate authentication device 130 to perform a first part of the user authentication. The specific authentication procedure for each authenticator may be as described herein or as known to those skilled in the art.

In some embodiments of method 700, at step 740, user authentication framework 410 determines whether the authentication at step 730 was successful and, if so, determines at step 745 whether further user authentication is required. As the embodiments described herein generally perform authentication using multiple different authenticators, authenticator framework 410 will usually initiate authentication using the next authenticator at step 760. If no further authentication is required at step 745, and step 730 was successful, then user authentication framework 410 proceeds to allow access to the computing device, or data stored therein, at step 790. If authentication at step 730 was not successful, then, at step 750, user authentication framework 410 interacts with user interface module 420 to provide a non-authentication message on display subsystem 210.

In some embodiments, determining whether authentication at step 730 was successful in step 740 may be performed in the background while process flow continues to the next step without requiring the determining to be complete. In other words, the determining in step 740 may be executed in parallel with the next step, rather than in series. Once the determining in step 740 is complete, if the authentication was unsuccessful, process flow may jump to step 750, and a non-authentication message is provided.

At step 770, user authentication framework 410 determines whether the authentication using the next authenticator at step 760 was successful. If the authentication at step 760 was not successful, then a non-authentication message is displayed at step 750. If the authentication at step 760 was successful then, at step 780, user authentication framework 410 determines whether any further user authentication is required. If further user authentication is required, then steps 760 to 780 are performed with respect to the further user authentication. Otherwise, user authentication is considered by user authentication framework 410 to be complete and the mobile device 140 is unlocked at step 790.

In alternative embodiments, step 740 may be omitted and determination at steps 730 and 760 of whether the authentication of each authenticator was successful may be performed after authentication input has been received for all authenticators. In such embodiments, the order of performance of step 770 and step 780 as described above is reversed.

In addition to unlocking the mobile device 140 at step 790, user authentication framework 410 may cooperate with user interface module 420 to provide some kind of notification to the user to the effect that authentication was successfully completed, although the mere fact of unlocking the mobile device 140 may be sufficient indication to the user that authentication was successful.

Although not specifically shown in FIG. 7, user authentication framework 410 may record each event in which authentication at step 730 or 760 was not successful in order to determine whether access to mobile device 140 or sensitive data stored therein is being sought by an unauthorized user. Further, user authentication framework 410 may store any input that is received during the failed authentication attempts, as such information may help to identify the unauthorized user.

While the above description describes the example embodiments in some detail, it will be appreciated that some features and/or functions of the described embodiments are susceptible to modification without departing from the spirit and principles of operation of the described embodiments. Accordingly, what has been described above is intended to be illustrative of the disclosure and non-limiting.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A method for user authentication for a computing device, the method comprising:
providing a user interface in a display of the computing device, wherein the user interface permits configuration of authentication options prior to performing an authentication to access the computing device or data stored therein;
displaying a list of different authenticators at the computing device via the user interface;
enabling receipt of input in relation to a selection of a plurality of selected authenticators from the list;
displaying, via the user interface, the selection of the plurality of selected authenticators from the list in a first order of selected authenticators;
enabling receipt of additional input in response to the selection of the plurality of selected authenticators from the list, wherein the additional input defines a re-ordering of the selection of the plurality of selected authenticators from the first order of selected authenticators to a second order of selected authenticators;
displaying, via the user interface, the selection of the plurality of selected authenticators from the list in the second order of selected authenticators; and
storing reference information identifying the plurality of selected authenticators, and storing order-of-use information that identifies the second order of selected authenticators in a memory of the computing device, wherein the reference information is used when performing the authentication to access the computing device or data stored therein such that the authentication requires the plurality of selected authenticators to be provided in the second order of selected authenticators before access to the computing device or data stored therein is granted.

2. The method of claim 1, wherein the plurality of selected authenticators comprises at least two of: a smart card authenticator; a fingerprint authenticator; a handprint authenticator; an iris authenticator; a DNA authenticator; a voice authenticator; a retinal authenticator; and a facial image authenticator.

3. The method of claim 1, wherein the enabling comprises launching an authenticator configuration application to display an authenticator configuration window on a display of the computing device, and wherein the list is displayed in the authenticator configuration window.

4. The method of claim 1, wherein the computing device comprises a mobile device.

5. The method of claim 1, further comprising:
determining that user authentication is required to be performed in relation to the computing device or data stored therein;
retrieving from the memory of the computing device the reference information identifying the plurality of selected authenticators;
performing a first authentication using a required authenticator of the plurality of selected authenticators;
performing at least one next authentication using a user-selected authenticator of the plurality of selected authenticators if the first authentication is successful; and
allowing access to the computing device or data stored therein if each of the at least one next authentication is successful.

6. The method of claim 5, wherein the required and next authentications are performed in a predetermined order based on the order-of-use information.

7. The method of claim 1, wherein the additional input comprises an instruction to drag and drop one of the plurality of selected authenticators from the list in the first order of selected authenticators from one position in the list to a different position in the list.

8. The method of claim 1, wherein the method further comprises displaying a plurality of menu options for one of the plurality of selected authenticators from the list in the first order of selected authenticators, and wherein the additional input comprises an instruction in response to a selection of one of the plurality of menu options to move the one of the plurality of selected authenticators from the list in the first order of selected authenticators up at least one position or down at least one position in the list.

9. The method of claim 1, wherein at least one of said different authenticators in the list is a selected required authenticator that cannot be unselected, and wherein at least one other of said different authenticators is user-selectable.

10. A computing device comprising:
a processor;
a display responsive to the processor;
at least one communication subsystem responsive to the processor for communicating with a plurality of authentication devices;
input componentry communicably coupled to the processor; and
a memory accessible to the processor, the memory storing program code which, when executed by the processor, causes the processor to:

provide a user interface in a display of the computing device, wherein the user interface permits configuration of authentication options prior to performing an authentication to access the computing device or data stored therein;
display a list of different authenticators at the computing device via the user interface;
enable receipt of input from the input componentry in relation to a selection of a plurality of selected authenticators from the list;
display, via the user interface, the selection of the plurality of selected authenticators from the list in a first order of selected authenticators;
enable receipt of additional input in response to the selection of the plurality of selected authenticators from the list, wherein the additional input defines a re-ordering of the selection of the plurality of selected authenticators from the first order of selected authenticators to a second order of selected authenticators;
display, via the user interface, the selection of the plurality of selected authenticators from the list in the second order of selected authenticators and
store in the memory reference information identifying the plurality of selected authenticators, and store order-of-use information that identifies the second order of selected authenticators, wherein the reference information is used when performing the authentication to access the computing device or data stored therein such that the authentication requires the plurality of selected authenticators to be provided in the second order of selected authenticators before access to the computing device or data stored therein is granted.

11. The computing device of claim 10, wherein the plurality of selected authenticators comprises at least two of: a smart card authenticator; a fingerprint authenticator; a handprint authenticator; an iris authenticator; a DNA authenticator; a voice authenticator; a retinal authenticator; and a facial image authenticator.

12. The computing device of claim 10, wherein, when the program code is executed by the processor, the processor is further caused to launch an authenticator configuration application to display an authenticator configuration window on the display, wherein the list is displayed in the authenticator configuration window.

13. The computing device of claim 10, wherein the computing device comprises a mobile device.

14. The computing device of claim 10, wherein the memory further stores program code which, when executed by the processor, causes the processor to:
determine that user authentication is required to be performed in relation to the computing device or data stored therein;
retrieve from the memory the reference information;
perform a first authentication using a required authenticator of the plurality of selected authenticators, wherein the first authenticator is identified by the reference information;
perform at least one next authentication using a user-selected authenticator of the plurality of selected authenticators if the first authentication is successful, wherein the next authenticator is identified by the reference information; and
allow access to the computing device or data stored therein if each of the at least one next authentication is successful.

15. The computing device of claim 14, wherein the required and next authentications are performed in a predetermined order based on the order-of-use information.

16. The computing device of claim 10, wherein the additional input received by the processor comprises an instruction to drag and drop one of the plurality of selected authenticators from the list in the first order of selected authenticators from one position in the list to a different position in the list.

17. The computing device of claim 10, wherein the processor is further configured to display a plurality of menu options for one of the plurality of selected authenticators from the list in the first order of selected authenticators, and wherein the additional input comprises an instruction in response to a selection of one of the plurality of menu options to move the one of the plurality of selected authenticators from the list in the first order of selected authenticators up at least one position or down at least one position in the list.

18. The computing device of claim 10, wherein at least one of said different authenticators in the list is a selected required authenticator that cannot be unselected, and wherein at least one other of said different authenticators is user-selectable.

19. Non-transitory computer readable storage storing program code which, when executed by a processor in a computing device, causes the processor to provide a user interface in a display of the computing device, wherein the user interface permits configuration of authentication options prior to performing an authentication to access the computing device or data stored therein;

display a list of different authenticators at the computing device via the user interface;

enable receipt of input in relation to a selection of a plurality of selected authenticators from the list;

display, via the user interface, the selection of the plurality of selected authenticators from the list in a first order of selected authenticators;

enable receipt of additional input in response to the selection of the plurality of selected authenticators from the list, wherein the additional input defines a re-ordering of the selection of the plurality of selected authenticators from the first order of selected authenticators to a second order of selected authenticators;

display, via the user interface, the selection of the plurality of selected authenticators from the list in the second order of selected authenticators; and store, in a memory accessible to the processor, reference information identifying the plurality of selected authenticators, and store, in the memory, order-of-use information that identifies the second order of selected authenticators, wherein the reference information is used when performing the authentication to access the computing device or data stored therein such that the authentication requires the plurality of selected authenticators to be provided in the second order of selected authenticators before access to the computing device or data stored therein is granted.

\* \* \* \* \*